(12) United States Patent
Tan et al.

(10) Patent No.: US 12,474,008 B2
(45) Date of Patent: Nov. 18, 2025

(54) SYSTEM AND METHOD INCLUDING SENSOR ARRAY FOR CHARACTERIZATION OF CONDUITS

(71) Applicant: General Electric Company, Schenectady, NY (US)

(72) Inventors: Yew Teck Tan, Schenectady, NY (US); Deepak Trivedi, Halfmoon, NY (US); Steven Robert Gray, San Mateo, CA (US); Pei-Hsin Kuo, Alplaus, NY (US); Alexander Kyle Duncan, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 413 days.

(21) Appl. No.: 17/981,955

(22) Filed: Nov. 7, 2022

(65) Prior Publication Data
US 2024/0151344 A1    May 9, 2024

(51) Int. Cl.
| | | |
|---|---|---|
| *F16L 55/48* | (2006.01) | |
| *F16L 55/38* | (2006.01) | |
| *F16L 101/30* | (2006.01) | |

(52) U.S. Cl.
CPC .............. *F16L 55/48* (2013.01); *F16L 55/38* (2013.01); *F16L 2101/30* (2013.01)

(58) Field of Classification Search
CPC ....... F16L 55/48; F16L 55/38; F16L 2101/30; F16L 55/44; F16L 55/30; F16L 55/34
See application file for complete search history.

(56) References Cited

U.S. PATENT DOCUMENTS

| | | | |
|---|---|---|---|
| 3,525,111 A | 8/1970 | Von Arx | |
| 4,162,635 A | 7/1979 | Triplett et al. | |
| (Continued) | | | |

FOREIGN PATENT DOCUMENTS

| | | |
|---|---|---|
| CN | 114675343 A | 6/2022 |
| KR | 101880739 B1 | 7/2018 |
| (Continued) | | |

OTHER PUBLICATIONS

Lee et al., "Autonomous navigation of in-pipe working robot in unknown pipeline environment", 2011 IEEE International Conference on Robotics and Automation, May 9, 2011, pp. 1559-1564.
(Continued)

*Primary Examiner* — David Z Huang
(74) *Attorney, Agent, or Firm* — Armstrong Teasdale LLP

(57) ABSTRACT

A system includes a navigation apparatus and controller. The navigation apparatus includes a body assembly that includes a plurality of pneumatic or artificial muscles that are configured to interact with a sidewall of the conduit and move the body assembly through the conduit. The plurality of pneumatic or artificial muscles are independently actuated to steer the body assembly. The navigation apparatus also includes a sensor array coupled to the body assembly. The sensor array is positioned to interact with the sidewall of the conduit and provide signals as the body assembly moves through the interior cavity. The controller is communicatively coupled to the sensor array and configured to determine a characteristic of the conduit based on the signals provided by the sensor array.

17 Claims, 7 Drawing Sheets

(56) References Cited

U.S. PATENT DOCUMENTS

| | | | |
|---|---|---|---|
| 4,372,161 A * | 2/1983 | de Buda | F16L 55/44 |
| | | | 254/134.6 |
| 4,475,260 A | 10/1984 | Beck | |
| 5,423,630 A | 6/1995 | Imoto et al. | |
| 5,770,800 A * | 6/1998 | Jenkins | G01N 29/2456 |
| | | | 73/623 |
| 6,107,795 A | 8/2000 | Smart | |
| 6,371,631 B1 | 4/2002 | Reutemann | |
| 6,514,346 B1 | 2/2003 | Nichols | |
| 6,959,772 B2 | 11/2005 | Stegmaier et al. | |
| 7,210,364 B2 | 5/2007 | Ghorbel et al. | |
| 7,812,328 B2 | 10/2010 | Betz | |
| 7,841,249 B2 | 11/2010 | Tormoen | |
| 8,661,909 B2 | 3/2014 | Chu et al. | |
| 11,255,479 B2 | 2/2022 | Radichel et al. | |
| 2003/0039752 A1 | 2/2003 | Winiewicz et al. | |
| 2020/0278069 A1 * | 9/2020 | Xiong | G01M 5/0025 |
| 2021/0025533 A1 | 1/2021 | Duncan et al. | |
| 2021/0025534 A1 | 1/2021 | Duncan et al. | |
| 2021/0025535 A1 | 1/2021 | Duncan et al. | |
| 2021/0025536 A1 | 1/2021 | Duncan et al. | |

FOREIGN PATENT DOCUMENTS

| | | |
|---|---|---|
| KR | 102360388 B1 | 2/2022 |
| WO | 2012141468 A2 | 10/2012 |
| WO | 2016169732 A1 | 10/2016 |

OTHER PUBLICATIONS

Hyun et al., "Compact self-contained navigation system with MEMS inertial sensor and optical navigation sensor for 3-D pipeline mapping", 2010 IEEE/RSJ International Conference on Intelligent Robots and Systems, Oct. 18, 2010, pp. 1488-1493.

Yatim et al., "Automated mapping for underground pipelines: An overview", 2014 2nd International Conference on Electrical, Electronics and System Engineering (ICEESE), Dec. 9, 2014, pp. 77-82.

* cited by examiner

SYSTEM AND METHOD INCLUDING SENSOR ARRAY FOR CHARACTERIZATION OF CONDUITS This invention was made with Government support under contract number D19AC00018 awarded by the Defense Advanced Research Projects Agency (DARPA). The Government has certain rights in this invention.

BACKGROUND

The field of the disclosure relates to systems for navigating conduits, and more particularly to systems including a sensor array and a controller configured to determine characteristics of a conduit based on information provided by the sensor array.

Conduits such as pipes are commonly used to transport fluids and have variable shapes, sizes, and materials. For example, typical conduits include a cylindrical sidewall that defines an interior cavity. During operation, fluids are transported within the interior cavity of the conduits. Sometimes, the fluids that are transported through the conduits have characteristics that can cause wear, deterioration, or otherwise affect the properties of the conduits. As a result, the conduits may require routine inspection and repair. However, the interior cavity of the conduits may be difficult to access for routine maintenance. For example, at least some known conduits are used to transport fluids having high temperatures, pressures, and/or other properties that create conditions which are inhospitable for at least some known navigation apparatus. Moreover, at least some conduits are difficult for at least some known apparatus to travel through because of the conduits' size, shape, and obstacles within the interior cavity.

Conduits may be connected together in complex conduit networks including different types of connections, bends, valves, or other elements. Maps of the conduit networks may be generated to facilitate navigation apparatus moving through and performing maintenance operations for at least some elements of the conduit networks. The maps may be generated based at least in part on information from apparatus that are positioned within the conduit networks. However, at least some elements of the conduit networks are difficult for at least some known apparatus to identify, access, and/or travel through. For example, at least some known navigation apparatus may not be able to accurately identify and/or provide information regarding branches or other conduit elements of the conduit networks. Also, at least some known systems are unable to provide precise and reliable localization information for the apparatus within the interior cavity. As a result, at least some characteristics of the conduit networks may be unknown or incorrect, and maps based on the characteristics may be incomplete and inaccurate.

Accordingly, it is desirable to provide a system including a sensor array and a controller configured to accurately determine characteristics of the conduits based on information provided by the sensor array.

BRIEF DESCRIPTION

In one aspect, a system includes a navigation apparatus and controller. The navigation apparatus includes a body assembly including a plurality of pneumatic or artificial muscles that are configured to interact with a sidewall of the conduit and move the body assembly through the conduit. The plurality of pneumatic or artificial muscles are independently actuated to steer the body assembly. The navigation apparatus also includes a sensor array coupled to the body assembly. The sensor array is positioned to interact with the sidewall of the conduit and provide signals as the body assembly moves through the interior cavity. The controller is communicatively coupled to the sensor array and configured to determine a characteristic of the conduit based on the signals provided by the sensor array.

In another aspect, a navigation apparatus is provided. The navigation apparatus includes a body assembly including a plurality of pneumatic or artificial muscles that are configured to interact with a sidewall of the conduit and move the body assembly through the conduit. The plurality of pneumatic or artificial muscles are independently actuated to steer the body assembly. The navigation apparatus also includes a sensor array coupled to the body assembly. The sensor array includes a plurality of sensors extending outward from the body assembly and positioned to interact with a sidewall of the conduit and provide signals as the body assembly moves through the interior cavity.

In yet another aspect, a method includes moving a body assembly of a navigation apparatus through an interior cavity of a conduit. The body assembly includes a plurality of pneumatic or artificial muscles that are configured to interact with a sidewall of the conduit and move the body assembly through the conduit. The plurality of pneumatic or artificial muscles are independently actuated to steer the body assembly. The method also includes contacting the sidewall with at least one sensor of a sensor array coupled to the body assembly. The sensor array is positioned to interact with the sidewall of the conduit and provide signals as the body assembly moves through the interior cavity. The method also includes determining, by a controller, a characteristic of the conduit based on the signals provided by the sensor array.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
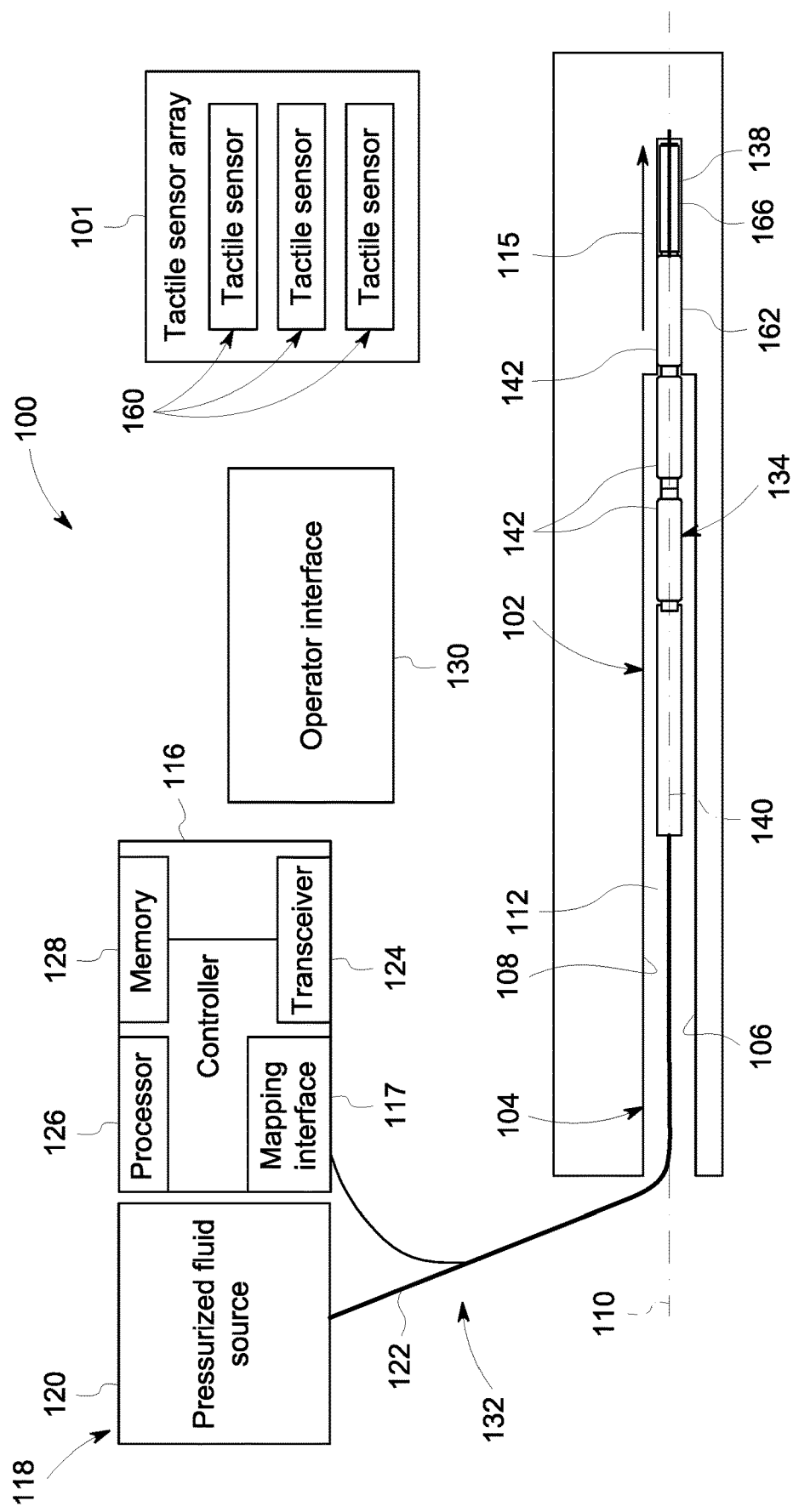
FIG. 1 is a schematic diagram of one embodiment of a system for navigating a conduit including a navigation apparatus and a sensor array.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system including a navigation apparatus and a sensor array. The navigation apparatus includes a body assembly configured to move through an interior cavity of a conduit. In one embodiment, the sensor array includes a plurality of tactile sensors positioned to interact with a sidewall of the conduit and provide tactile information as the body assembly moves through the interior cavity. For example, the plurality of tactile sensors may be arranged circumferentially around an outer surface of the body assembly and positioned to extend radially outward from the outer surface of the body assembly. The system also includes a controller communicatively coupled to the sensor array and configured to determine a characteristic of the conduit based on the tactile information provided by the sensor array. For example, the controller may be configured to determine a location of the navigation apparatus and generate a map of the conduit network based on a location of the navigation apparatus and the characteristic of the conduit. As a result, the system facilitates determining characteristics of conduits in difficult to access locations and generating maps of complex conduit networks. Moreover, the sensor array may include passive tactile sensors that utilize less power than other sensors.

FIG. 1 is a schematic diagram of a system 100 including a navigation apparatus 102 traveling underground, and a sensor array 101. For example, the navigation apparatus 102 is configured to travel through a conduit 104. Conduit 104 includes a sidewall 106 having an interior surface 108 extending around a central axis 110 and defining an interior cavity 112. Navigation apparatus 102 is configured to fit within interior cavity 112 and travel along the length of conduit 104. Accordingly, navigation apparatus 102 facilitates construction of conduit 104 and/or inspection and repair of conduit 104. Moreover, navigation apparatus 102 is self-propelled, meaning that navigation apparatus 102 moves within interior cavity 112 without an external force acting on navigation apparatus 102.

During operation, for example, navigation apparatus 102 may be positioned within interior cavity 112 through an opening. In the illustrated embodiment, navigation apparatus 102 travels in a travel direction 115. In some embodiments, navigation apparatus 102 traverses transitions in conduit 104 such as bends or size transitions. As navigation apparatus 102 travels through interior cavity 112, navigation apparatus 102 is configured to form, inspect, and/or repair any portions of conduit 104.

System 100 includes navigation apparatus 102, a controller 116 communicatively coupled to navigation apparatus 102, a fluid supply system 118, and sensor array 101. Fluid supply system 118 includes a pressurized fluid source 120 that is coupled to navigation apparatus 102 via a fluid line 122. Fluid supply system 118 is configured to regulate pressurized fluid that is delivered to/removed from navigation apparatus 102 for operation of navigation apparatus 102.

In addition, in the example embodiment, controller 116 is configured to provide instructions to move navigation apparatus 102 through conduit 104 and/or to perform inspection or repair operations. Controller 116 includes a transceiver 124, a processor 126, and a memory 128. In some embodiments, controller 116 is positioned remotely from navigation apparatus 102, e.g., controller 116 is located at a base station that enables an operator on an exterior of conduit 104 (shown in FIG. 1) to interact with navigation apparatus 102, and/or controller 116 can be at least partly incorporated into and located on board navigation apparatus 102. Transceiver 124 is communicatively coupled with navigation apparatus 102 and is configured to send information to and receive information from a transceiver of navigation apparatus 102. In some embodiments, transceiver 124 and a transceiver on navigation apparatus 102 communicate wirelessly. In alternative embodiments, navigation apparatus 102 and controller 116 communicate in any manner that enables system 100 to operate as described herein. For example, in some embodiments, controller 116 and navigation apparatus 102 exchange information through a wired link extending between navigation apparatus 102 and controller 116.

In addition, in some embodiments, controller 116 is at least partly located on board navigation apparatus 102 and is configured to execute instructions for controlling components of navigation apparatus 102, such as a maintenance tool and drive systems. For example, controller 116 executes instructions that cause navigation apparatus 102 to move in a selected direction. In alternative embodiments, navigation apparatus 102 includes any controller that enables system 100 to operate as described herein. In some embodiments, controller 116 is not located on board navigation apparatus 102.

In some embodiments, navigation apparatus 102 includes one or more sensors and/or repair tools or conduit maintenance tools. For example, in some embodiments, navigation apparatus 102 includes a repair tool configured to repair interior surface 108, and/or an inspection tool configured to inspect a portion of the interior cavity 112.

Also, in the example embodiment, an operator interface 130 is configured to display information relating to the characteristics detected by navigation apparatus 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 108 based on received signals. In some embodiments, operator interface 130 allows an operator to input and/or view information relating to control of navigation apparatus 102. In the example embodiment, operator interface 130 is configured to display information relating to the state of one or more of a maintenance tool and a power source for interpretation by the operator. For example, state information may include a position of navigation apparatus 102 along a length of conduit 104 (shown in FIG. 1). State information may also include a charge status of a power source and/or a current draw for various drive and positioning motors. In various embodiments, processor 126 translates operator inputs into steering, tool motion, camera control, sensor control, sensor motion, and/or any other commands and sends information via transceiver 124 to navigation apparatus 102 via a transceiver of navigation apparatus 102. In some embodiments, operator control of navigation apparatus 102 is in real time, such as through a joystick, a keyboard, a touchscreen, a remote motion capture system, and/or a wearable motion capture system or other interface having similar function. In other embodiments, navigation apparatus 102 is controlled partially or wholly according to a pre-programmed routine. In further embodiments, navigation apparatus 102 is at least partially automated. In some embodiments, an operator inputs information such as operation goals or conditional directions. In further embodiments, information, such as information received by controller 116 from navigation apparatus 102, control data sent to navigation apparatus 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of conduit 104 and communicates with navigation apparatus 102 positioned within interior cavity 112 of conduit 104. For example, controller 116 is configured to send information to navigation apparatus 102 relating to the propulsion and/or steering of navigation apparatus 102 while navigation apparatus 102 is moving within interior cavity 112 of conduit 104 through a wireless connection and/or a tether 132. In alternative embodiments, controller 116 and navigation apparatus 102 are configured in any manner that enables system 100 to operate as described herein.

In the example embodiment, navigation apparatus 102 includes a body assembly 134 and a tip 138. Body assembly 134 of navigation apparatus 102 has a longitudinal axis 140. Body assembly 134 includes a plurality of sections 142 that extend along longitudinal axis 140. Sections 142 of body assembly 134 are modular and are detachably coupled together. Sections 142 of body assembly 134 are configured to move body assembly 134 through interior cavity 112 of conduit 104. For example, sections 142 of body assembly 134 selectively expand and contract (e.g., widths and/or lengths of sections 142 selectively increase and/or decrease) to propel body assembly 134 through conduit 104. For example, each section 142 of body assembly 134 is configured to switch from a first configuration having a first length and/or a first width to a second configuration having a second length and/or a second width. For example, sections 142 may each include pneumatic artificial muscles having elastomeric tubular membranes with fiber reinforcements and radial and axial actuators. For example, artificial muscles are actuators that are compliant (e.g., actuators that have elastic modulus within an order of magnitude of natural muscles) and can undergo large deformations (e.g., deformations greater than 5%). The artificial muscles can be actuated in a number of different ways such as using pneumatic or hydraulic pressure, or using electrical, magnetic, thermal or chemical stimulus. The artificial muscles can be constructed of materials such as elastomers (e.g., silicone, natural rubber, NBR, HNBR, Viton, etc.) and/or electroactive polymers (e.g., liquid crystalline elastomers, dielectric elastomers, shape memory polymers, shape memory alloys, hydrogels, etc.). The pneumatic artificial muscles operate based on instructions from controller 116 to cooperatively propel body assembly 134 in desired directions. As a result, sections 142 of body assembly 134 are designed to provide an axial force and a radial force that propel body assembly 134 and tether 132 through underground locations. In the example embodiment, body assembly 134 and tether 132 do not require a separate linear actuator for propulsion. In some embodiments, body assembly 134 includes at least three sections 142 (e.g., a first section, a second section, and a third section) that are configured to cooperate and provide a crawling action (e.g., peristaltic motion and/or two-anchor crawling) to propel body assembly 134 through conduit 104. In alternative embodiments, navigation apparatus 102 includes any body assembly 134 that enables navigation apparatus 102 to operate as described herein.

In some embodiments, tip 138 includes at least one of a sensor and/or a repair tool, and tip 138 is configured to perform a maintenance operation within conduit 104. For example, in some embodiments, tip 138 includes, without limitation, any of the following: an applicator, a drill, a grinder, a heater, a welding electrode, a cleaning apparatus (e.g., a sprayer, scrubber, squeegee, and/or brush), an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, a navigation apparatus on tip 138 is used to provide information for steering navigation apparatus 102 and/or to perform a maintenance operation.

In the example embodiment, tip 138 is coupled to body assembly 134 and includes sensor array 101. In alternative embodiments, navigation apparatus 102 includes any tip 138 that enables navigation apparatus 102 to operate as described herein. For example, in some embodiments, tip 138 is shaped to engage material and displace material as navigation apparatus 102 moves through conduits to clean the conduits.

In addition, in some embodiments, navigation apparatus 102 includes a light source (not shown) configured to irradiate at least a portion of interior cavity 112 to facilitate visual or non-visual steering of navigation apparatus 102 and/or to allow a navigation apparatus to capture images, for example. The light source may be coupled to body assembly 134 and, in some embodiments, may be positionable relative to body assembly 134. In alternative embodiments, navigation apparatus 102 includes any light source that enables navigation apparatus 102 to operate as described herein.

In addition, in the example embodiment, pressurized fluid source 120 is coupled to one or more components of navigation apparatus 102 via fluid line 122. For example, sections 142 of body assembly 134 are configured to selectively switch configurations and propel body assembly 134 when pressurized fluid is delivered to or removed from sections 142 via fluid line 122. In alternative embodiments, system 100 includes any pressurized fluid source 120 that enables system 100 to operate as described herein. For example, in some embodiments, pressurized fluid source 120 includes separate fluid tanks and/or pumps that are coupled to and configured to regulate pressurized fluid in sections 142. In addition, in some embodiments, system 100 includes a plurality of fluid lines 122 coupled to body assembly 134.

Sensor array 101 facilitates controller 116 determining characteristics of a conduit and operating parameters of system 100. For example, sensors 160 of sensor array 101 are configured to interact with sidewalls 106 of conduit 104 and provide signals based on the interaction. In the example embodiment, controller 116 is configured to compare signals transmitted by sensors 160 and determine a characteristic of conduit 104 based on the signals. For example, controller 116 is configured to determine a characteristic such as a location of a conduit network element (e.g., a T-junction, a Y-junction, an elbow, and/or any other element), a conduit size, a conduit or conduit element type, a presence of an obstacle within the interior cavity 112, and/or any other characteristic based at least partly on information from sensor array 101.

In addition, in some embodiments, controller 116 is configured to determine an operating parameter for navigation apparatus 102 based on the characteristic of the conduit and/or the signals sent by sensors 160. For example, controller 116 is configured to determine a location and/or orientation of navigation apparatus 102 and/or elements of conduit 104 based at least partly on the comparison of the signals. In addition, controller 116 is configured to determine a path for navigation apparatus 102 based on the signals. For example, controller 116 determines a path to avoid an obstacle identified based on the signals. Moreover, sensor array 101 facilitates controller 116 making dynamic changes to the path and/or other operating parameters of navigation apparatus 102 because sensor array 101 provides robust characterization capabilities and enhanced detection of characteristics of conduit 104.

Also, in the example embodiment, controller 116 includes a mapping interface 117 configured to generate a map of interior cavity 112 of conduit 104 (shown in FIG. 1) around navigation apparatus 102 and/or conduit network 105 (shown in FIG. 4) based on information received from sensor array 101. For example, controller 116 is configured to determine a location of navigation apparatus 102 and a location of at least one conduit element, and generate a map of conduit network 105 based on information from sensor array 101. The map of conduit network 105 may include position information, health conditions of pipes, locations of defects or anomalies, and/or additional information measured by on-board sensors. For example, in some embodiments, system 100 includes a position sensor such as an inertial measurement unit, an encoder, and/or any other suitable sensor that is configured to provide position or orientation information for navigation apparatus 102 and/or tether 132. Controller 116 is configured to determine a position or location of navigation apparatus 102 based on the position information. Mapping interface 117 generates a map based on the determined position and the information from sensor array 101. For example, the map may include a series of data points (e.g., position information) and interrelations between the data points (e.g., vertices joining nodes in a graph). Accordingly, mapping interface 117 is able to generate an accurate and complete map of conduit networks even if global positioning systems (GPS) or other network based location systems are inaccessible.

Figure 2:
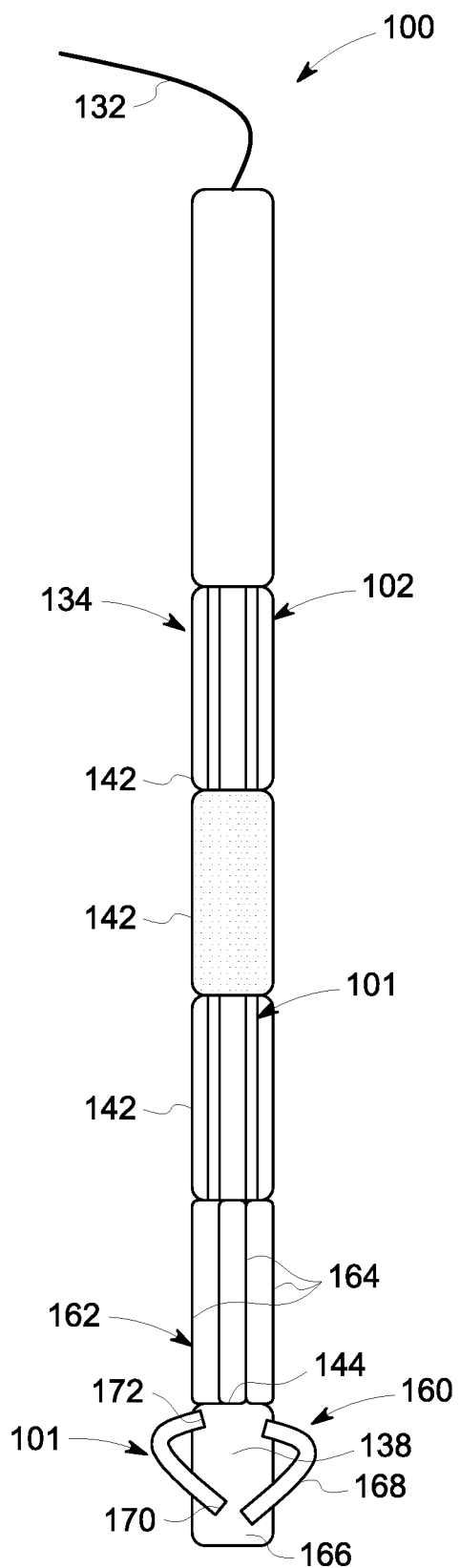
FIG. 2 is a perspective view of a portion of the navigation apparatus shown in FIG. 1.

FIG. 2 is a perspective view of a portion of navigation apparatus 102. Body assembly 134 of navigation apparatus 102 includes at least one steering section 162 that is configured to facilitate steering of navigation apparatus 102 and enable navigation apparatus 102 to navigate bends, obstacles, or other conduit elements within conduit 104. For example, steering section 162 includes a plurality of individually actuated muscles (e.g., pneumatic actuated muscles) 164 that are coupled together and individually positionable to steer navigation apparatus 102. In the example embodiment, steering section 162 includes three individually actuated muscles 164. In alternative embodiments, navigation apparatus 102 includes any steering section 162 that enables navigation apparatus 102 to operate as described herein. In some embodiments, steering section 162 is omitted.

Tip 138 is coupled to steering section 162 of body assembly 134 and includes sensor array 101. Sensor array 101 includes a plurality of sensors 160 positioned to interact with sidewall 106 (shown in FIG. 1) of conduit 104 (shown in FIG. 1) and provide information as body assembly 134 moves through interior cavity 112 (shown in FIG. 1). Sensors 160 are configured to provide signals or readings based on physical interaction with the environment. For example, the physical interaction may be mechanical, electrical, and/or electromechanical. In the illustrated example embodiment, sensor array 101 includes five sensors 160. Sensors 160 may include pressure sensors, strain gauges, and/or any other sensor. In alternative embodiments, sensor array 101 includes any sensors 160 that enable sensor array 101 to function as described herein. For example, in some embodiments, sensor array 101 includes at least two sensors 160.

In the example embodiment, tip 138 has an outer surface 166 defining a circumference. Sensors 160 are arranged circumferentially around outer surface 166 and positioned to extend radially outward from outer surface 166. Sensors 160 are resiliently flexible such that sensors 160 move when experiencing an external force and return to a neutral position when the external force is removed from sensors 160. For example, in the illustrated embodiment, opposite ends 170, 172 of sensors 160 are coupled to outer surface 166 such that sensors 160 form a loop that is arranged to contact a surface of sidewall 106 (shown in FIG. 1) of conduit 104 (shown in FIG. 1). In some embodiments, only one end 170, 172 of sensors 160 is coupled to outer surface 166. In alternative embodiments, sensors 160 are arranged in any manner that enables sensors 160 to function as described herein. In some embodiments, sensors 160 have embedded elastic elements made of materials such as nickel titanium (NiTiNol), steel, or plastic, and the elastic elements provide the ability to bend elastically and regain shape when external forces are removed.

In some embodiments, sensors 160 are coupled to body assembly 134 of navigation apparatus 102. For example, in some embodiments, sensors 160 may be coupled to separate sections 142 of body assembly 134 at distinct locations that are spaced apart along longitudinal axis 140. In further embodiments, at least some sensors 160 are coupled to the same section 142 of body assembly 134. In some embodiments, sensors 160 are coupled to tether 132. In further embodiments, a plurality of sensors 160 are arranged circumferentially around body assembly 134 and positioned to extend radially outward from an outer surface of body assembly 134.

Figure 3:
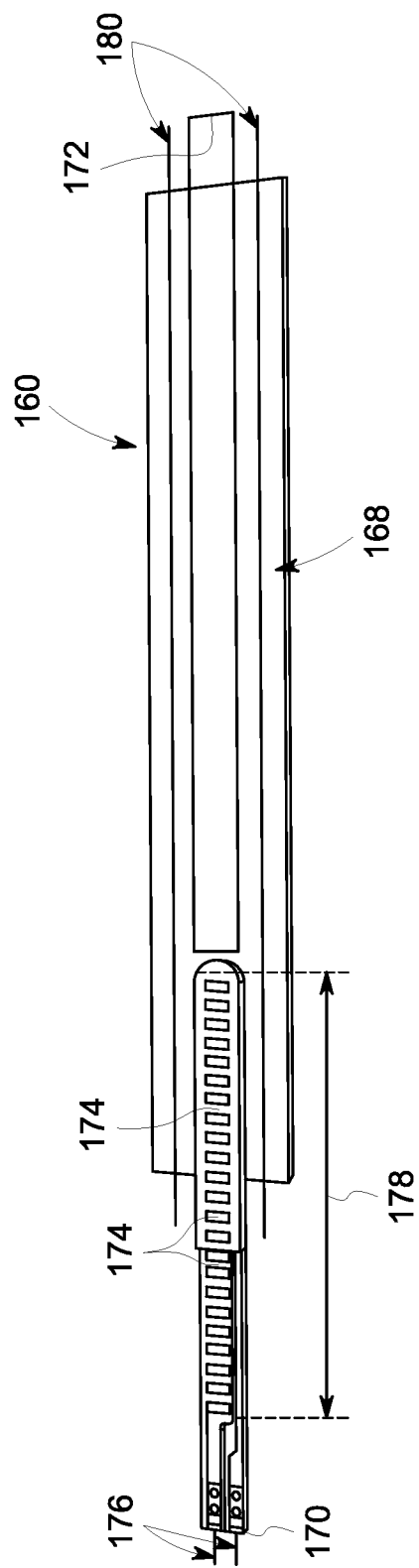
FIG. 3 is a side view of a sensor of the sensor array of FIG. 1, in a laid flat position.

FIG. 3 is a side view of a sensor 160 of sensor array 101 in a laid flat position. Sensor 160 includes a body 168 having a first end 170 and a second end 172, a plurality of contact pressure elements 174, and at least one electrical connector 176. Contact pressure elements 174 are coupled to body 168 and arranged in a series between first end 170 and second end 172 to provide a functional sensing range 178. Contact pressure elements 174 within functional sensing range 178 are configured to interact with the sidewall and provide signals representing the interaction between the sidewall and sensor 160. For example, contact pressure elements 174 enable detection of contact with the walls of a conduit, as well as the force with which the sensor is touching the wall. By detecting which of sensors 160 are in contact with the wall and which sensors 160 are not contacting a wall, sensor array 101 can detect presence of features such as junctions. Additionally, contact pressure elements 174 facilitate providing information about the extent to which sensors 160 bend before contact happens. Controller 116 (shown in FIG. 1) can determine characteristics such as the diameter of the conduit, and also the position of sensor array 101 within the conduit based on information from contact pressure elements 174. For example, if sensor array 101 is not centered within a conduit, sensors 160 closer to the wall will have the stronger contact pressure measurement, and sensors 160 farther from the wall will have a larger contact pressure measurement. A length of sensors 160 is so selected such that sensors 160 maintain contact with a wall of a pipe with the largest target diameter even if sensor array 101 has the most eccentric position possible relative to the pipe. In addition, controller 116 can determine the direction of gravity and/or an orientation based on information from sensors 160. For example, sensors 160 on a bottom of sensor array 101 while experience greater deflection than sensors 160 on top of sensor array 101 due to the force of gravity.

In the example embodiment, body 168 of sensor 160 is constructed of layered tape, e.g., Kapton dielectric tape. The layered tape is flexible but has a relatively high modulus, high tensile strength, high tear resistance, and low coefficient of friction. Contact pressure elements 174 are embedded within body 168. In addition, support wires 180 extend along sides of body 168 and provide support to body 168. Support wires 180 are flexibly resilient and allow body 168 to deform and return to an original shape. In alternative embodiments, sensor 160 includes any body 168 that enables sensor 160 to function as described herein.

For example, sensor 160 provides a measurable change in characteristic when sensor 160 interacts with a structure. In some embodiments, sensor 160 is a force sensitive resistor that directly measures a compressive force. For example, when sensor 160 interacts with a structure, a force compresses body 168 which can include a layers of flexible, printed piezoresistive ink. The compression of body 168 provides a proportional change in an electrical signal which can be calibrated to engineering force units. In further embodiments, sensor 160 includes electroactive polymers, capacitive measurement devices, Hall effect sensors, optical sensors (e.g., sensors that measure changes in refractive index), and/or any other sensor device.

Figure 4:
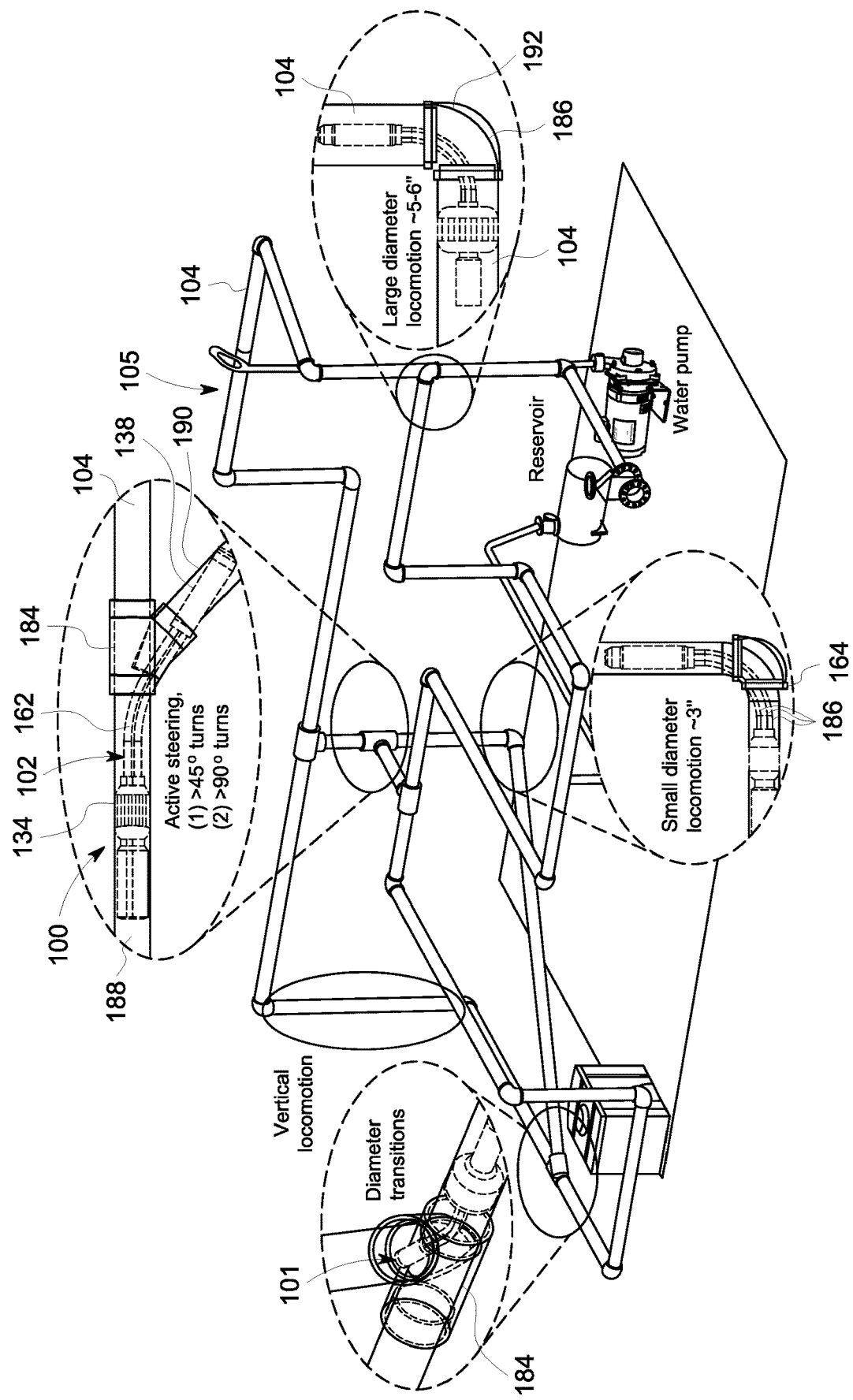
FIG. 4 is a schematic diagram of a conduit network and the navigation apparatus shown in FIG. 1 illustrating the navigation apparatus moving through the conduit network to generate a conduit network map.

FIG. 4 is a schematic diagram of a conduit network 105 illustrating navigation apparatus 102 being used to generate a map of conduit network 105. Conduit network 105 includes conduits 104, junction connectors (e.g., T-junctions, Y-junctions, and X-junctions) 184, elbow connectors 186, and/or any other suitable conduit elements. Navigation apparatus 102 is configured to travel in multiple directions through conduit network 105 and travel through, for example, conduits 104, junction connectors 184, and elbow connectors 186. Sensor array 101 is arranged to interact with sidewalls 106 of conduits 104 and facilitate system 100 generating a complete and accurate map of conduit network 105 as navigation apparatus 102 travels through conduit network 105. For example, sensor array 101 is coupled to tip 138 of navigation apparatus 102 and interacts with sidewalls 106 around tip 138. Steering section 162 of body assembly 134 is arranged to position tip 138 in different orientations and direct navigation apparatus 102 to provide sensor array 101 with a complete profile of interior cavity 112. In addition, navigation apparatus 102 is configured to move forward, move backward, and/or turn to ensure that sensor array 101 is able to obtain information regarding conduit branches and broken or irregular conduit of conduit network 105.

Figure 5:
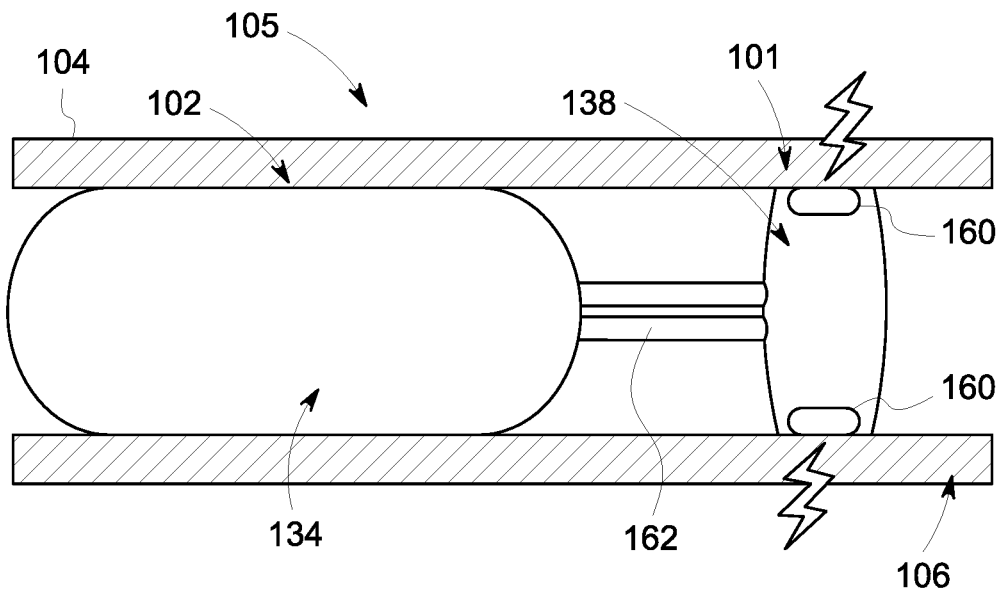
FIG. 5 is a schematic side view of a portion of the navigation apparatus shown in FIG. 1 illustrating the navigation apparatus moving through a conduit of the conduit network shown in FIG. 4.

FIG. 5 is a schematic side view illustrating navigation apparatus 102 moving through conduit 104 of conduit network 105. Conduit 104 is a straight conduit having a constant diameter. Accordingly, sensors 160 of sensor array 101 interact with sidewall 106 of conduit 104 and provide substantially uniform readings as navigation apparatus 102 moves through conduit 104 in a forward or backward direction. Sensors 160 are arranged around the circumference of navigation apparatus 102 and interact with sidewalls 106 at multiple points around the entire circumference to facilitate generating a complete map of conduit 104. For example, sensors 160 are distributed uniformly to sample points along the entire circumference. Accordingly, sensor array 101 provides information that can be used to identify conduit 104 and determine characteristics of conduit 104 such as a type and size of conduit 104. In addition, sensors 160 provide signals that are interpreted by controller 116 (shown in FIG. 1) as navigation apparatus 102 is traveling and do not necessarily require navigation apparatus 102 to stop at a location to inspect and collect information at the location.

Figure 6:
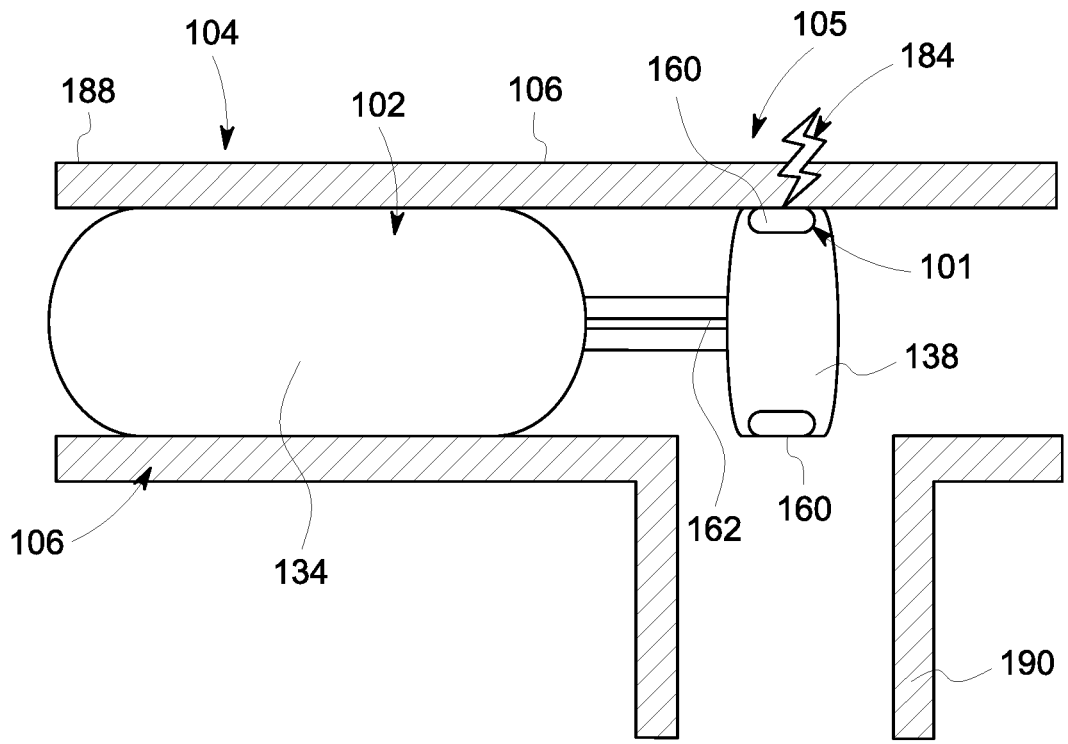
FIG. 6 is a schematic side view of a portion of the navigation apparatus shown in FIG. 1 illustrating the navigation apparatus moving through a junction connector of the conduit network shown in FIG. 4.

FIG. 6 is a schematic side view illustrating navigation apparatus 102 moving through junction connector 184 of conduit network 105. Junction connector 184 includes a straight section 188 and a branch section 190 extending at an angle relative to straight section 188. Sensors 160 of sensor array 101 interact with sidewall 106 of conduit 104 and provide different readings as navigation apparatus 102 moves through conduit 104 in a forward or backward direction. For example, sensors 160 contact and detect a presence of sidewalls 106 along straight section 188. Sensors 160 detect an opening of branch section 190 when some of sensors 160 are no longer in contact with sidewalls 106. Accordingly, sensor array 101 provides information that can be used to identify junction connector 184 and determine characteristics of junction connector 184 such as a type and size of junction connector 184. Steering section 162 may change the pose of sensor array 101 and direct navigation apparatus 102 at least partly into branch section 190 to facilitate collecting information and generating a map of branch section 190. In some embodiments, navigation apparatus 102 may travel past branch section 190 then change direction and backtrack to return to and explore branch section 190.

Figure 7:
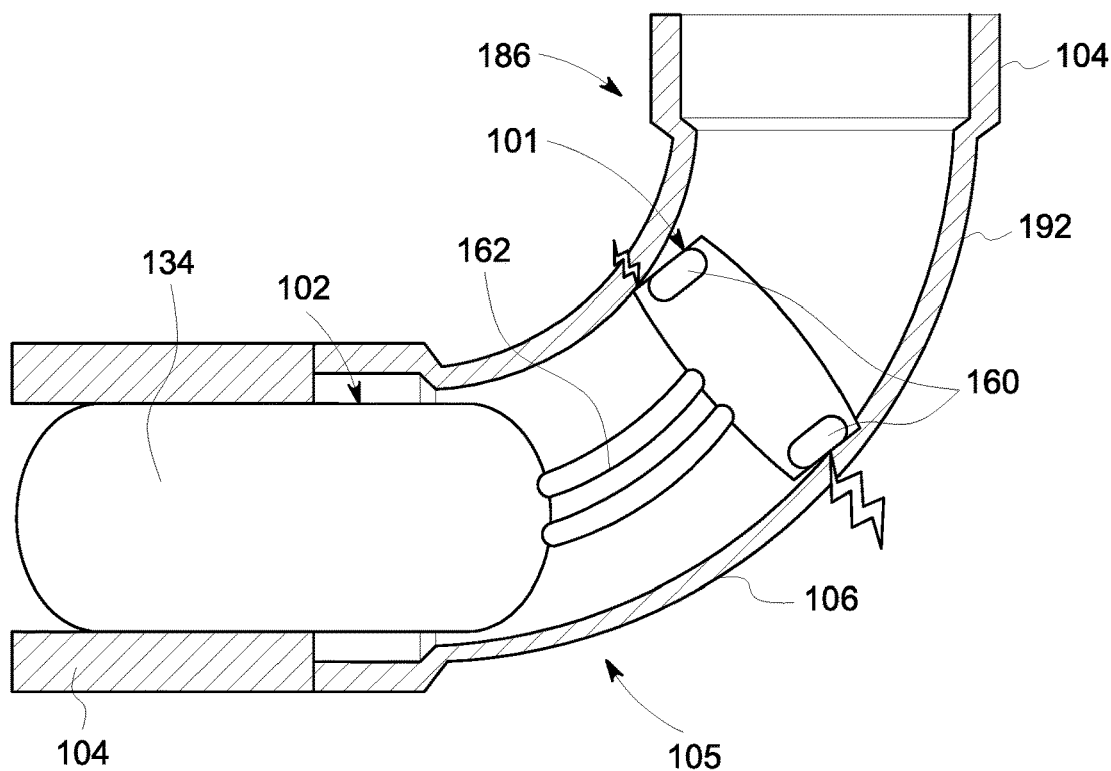
FIG. 7 is a schematic side view of a portion of the navigation apparatus shown in FIG. 1 illustrating the navigation apparatus moving through an elbow connector of the conduit network shown in FIG. 4.

FIG. 7 is a schematic side view illustrating navigation apparatus 102 moving through elbow connector 186 of conduit network 105. Elbow connector 186 includes a curved section 192 that connects two conduits 104 positioned at an angle relative to each other. Sensors 160 of sensor array 101 interact with sidewall 106 of conduits 104 and elbow connector 186 and provide different readings as navigation apparatus 102 moves through conduits 104 and elbow connector 186 in a forward or backward direction. For example, some sensors 160 of sensor array 101 may detect a greater strain or force based on the interaction with sidewall 106 as navigation apparatus 102 turns and travels through elbow connector 186. Accordingly, sensor array 101 provides information that can be used to identify elbow connector 186 and determine characteristics of elbow connector 186 such as a type and size of elbow connector 186. Steering section 162 may change the pose of sensor array 101 to facilitate collecting information and generating a map of elbow connector 186.

Referring to FIGS. 1-7, during operation, navigation apparatus 102 is positioned within interior cavity 112 of conduit 104. Controller 116 provides instructions that cause navigation apparatus 102 to travel through interior cavity 112 of conduit 104. Body assembly 134 propels navigation apparatus 102 through conduit 104. For example, sections 142 of body assembly 134 are selectively switched between first and second configurations to propel body assembly 134 forward.

Sensors 160 of sensor array 101 interact with sidewall 106 of conduit 104 as body assembly 134 is propelled forward. In addition, sensors 160 of sensor array 101 transmit and receive signals as navigation apparatus 102 travels through underground locations. For example, sensors 160 collect readings based on the interactions with sidewall 106 and send information to controller 116. Controller 116 determines characteristics of conduit 104 and/or the underground locations and/or operating parameters of navigation apparatus 102 based on the signals provided by sensor array 101. For example, controller 116 compares the readings and/or signals of different sensors 160 to identify features within interior cavity 112 and generate a map of conduit network 105.

Controller 116 provides instructions to direct navigation apparatus 102 through underground locations based at least in part on the determined characteristics of a conduit and/or the operating parameters. For example, controller 116 may generate instructions to cause navigation apparatus 102 to travel in a straight direction and/or to turn as body assembly 134 propels navigation apparatus 102. For example, controller 116 may send instructions that cause muscles in sections 142 of body assembly 134 to adjust and bend as sections 142 are selectively switched between configurations. Controller 116 may direct navigation apparatus 102 to explore and collect information on different elements of conduit network 105. For example, controller 116 identifies branches based on readings of sensors 160 and causes steering section 162 to turn navigation apparatus 102 at least partly into the branch for sensor array 101 to collect information regarding the branch. As a result, navigation apparatus 102 facilitates system 100 generating a more complete map of conduit network 105 than conventional systems because navigation apparatus 102 is able to move in multiple directions and turn into different elements of conduit network 105. In addition, sensor array 101 provides continuous readings of an entire sidewall 106 or features of conduit network 105 as navigation apparatus 102 travels through interior cavity 112. In some embodiments, the readings are used by controller 116 for feedback control to, for example, direct steering section 162 through different junctions and/or maintain tip 138 centered in the conduit. As a result, the readings and controller 116 facilitate preventing navigation apparatus 102 from getting stuck at different junctions.

During operation of navigation apparatus 102, in some embodiments, controller 116 receives signals from sensor array 101 and/or one or more other components of system 100 and updates a classification system for determining a characteristic of conduit network 105 (e.g., controller 116 self-learns). For example, controller 116 interprets signals from sensor array 101 and/or retrieves stored information regarding a prediction of characteristics of a conduit element. Controller 116 determines real-time readings based on signals from sensor array 101 and compares the real-time readings as navigation apparatus 102 moves through the conduit element to the predicted characteristic. Controller 116 modifies the classification system if there are differences between the measured characteristics and the predicted characteristics. Also, controller 116 tracks connectivity, distances, and/or other characteristics of conduit network 105 and continuously updates the characteristics as navigation apparatus 102 travels through conduit elements. In some embodiments, controller 116 determines and continuously updates a navigation algorithm for navigation apparatus 102 as navigation apparatus 102 travels through conduit network 105. For example, controller 116 records conduit branches that have been explored and identifies conduit branches for future exploration.

Figure 8:
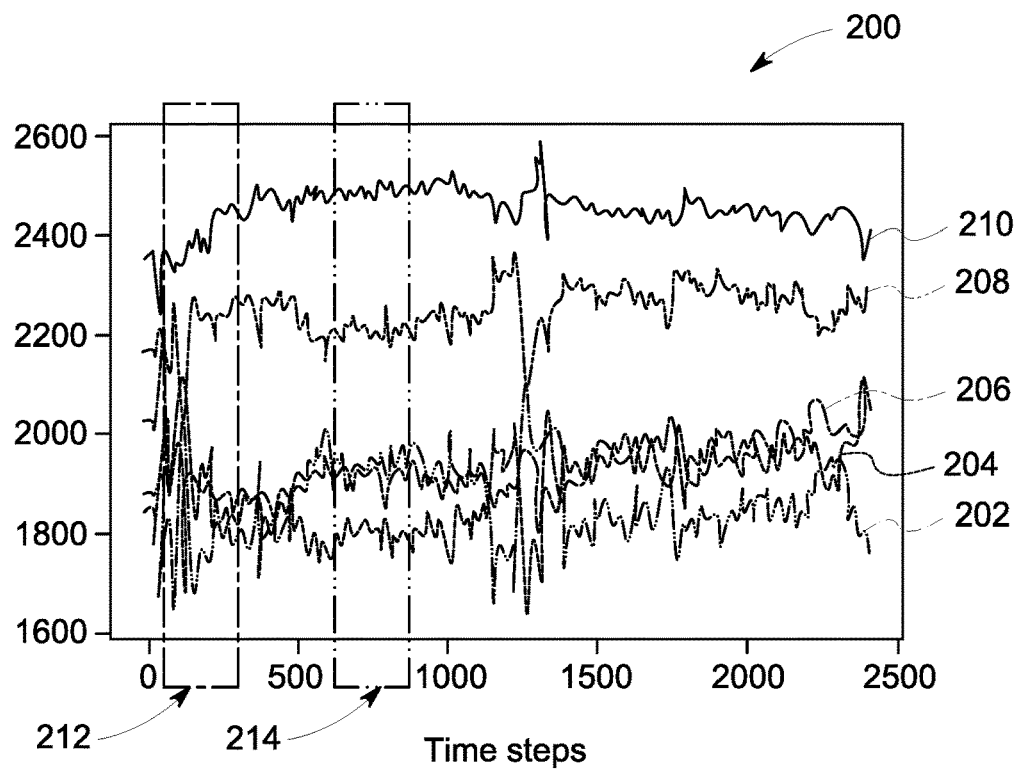
FIG. 8 is a graph illustrating tactile sensor readings from the sensor array of FIG. 1 as the navigation apparatus of FIG. 1 moves through a conduit network.

FIG. 8 is a graph 200 illustrating tactile sensor readings from sensor array 101 (shown in FIG. 1) as navigation apparatus 102 (shown in FIG. 1) moves through conduit network 105 (shown in FIG. 4). Graph 200 includes an x-axis indicating time, and a y-axis indicating contact readings of sensors 160 (shown in FIG. 1). Graph 200 includes a first curve 202 that represents readings from a first sensor 160, a second curve 204 that represents readings from a second sensor 160, a third curve 206 that represents readings from a third sensor 160, a fourth curve 208 that represents readings from a fourth sensor 160, and a fifth curve 210 that represents readings from a fifth sensor 160. First, second, third, fourth, and fifth sensors 160 are positioned at discrete locations around a circumference of navigation apparatus 102. First curve 202, second curve 204, third curve 206, fourth curve 208, and fifth curve 210 change and vary from each other as navigation apparatus 102 travels through interior cavity 112 and tactile sensors interact with sidewalls 106 of conduits 104 and other conduit network elements. Variations in first curve 202, second curve 204, third curve 206, fourth curve 208, and fifth curve 210 may be caused by the different circumferential positions of sensors 160, features on sidewalls 106, and/or different conduit network elements interacting with sensors 160.

Controller 116 (shown in FIG. 1) compares the readings from sensors 160 to determine characteristics of a conduit and/or operating parameters of system 100. For example, controller 116 compares sections of first curve 202, second curve 204, third curve 206, fourth curve 208, and fifth curve 210 within windows 212, 214 to identifies variations of first curve 202, second curve 204, third curve 206, fourth curve 208, and fifth curve 210 relative to each other. Controller 116 may identify features of conduit network 105 based on the variations. For example, a relatively low reading from at least one sensor 160 may indicate an opening or branch in conduit network 105. Controller 116 may discard some readings that are outside of an expected range based on readings of other sensors 160 or previously recorded information. In some embodiments, controller 116 includes an algorithm that provides a relationship between readings from sensors 160 and features of conduit network 105.

In the example embodiment, navigation apparatus 102 is configured to traverse and provide mapping of network features such as vertical sections that other systems are unable to properly identify. For example, controller 116 is able to determine an orientation of navigation apparatus 102 based on signals from an inclinometer, an inertial measurement unit, and/or another sensor onboard navigation apparatus 102. Alternatively or additionally, controller 116 determines the orientation of navigation apparatus 102 by storing an initial orientation of navigation apparatus 102 and tracking a history of signals from sensor array 101 and tracking which sensors 160 are interacting with walls and which are not as navigation apparatus 102 travels. Navigation apparatus 102 is able to traverse features such as vertical sections by manipulating steering section 162 and providing a vertical crawling action with sections 142 providing anchoring forces on vertical walls.

Figure 9:
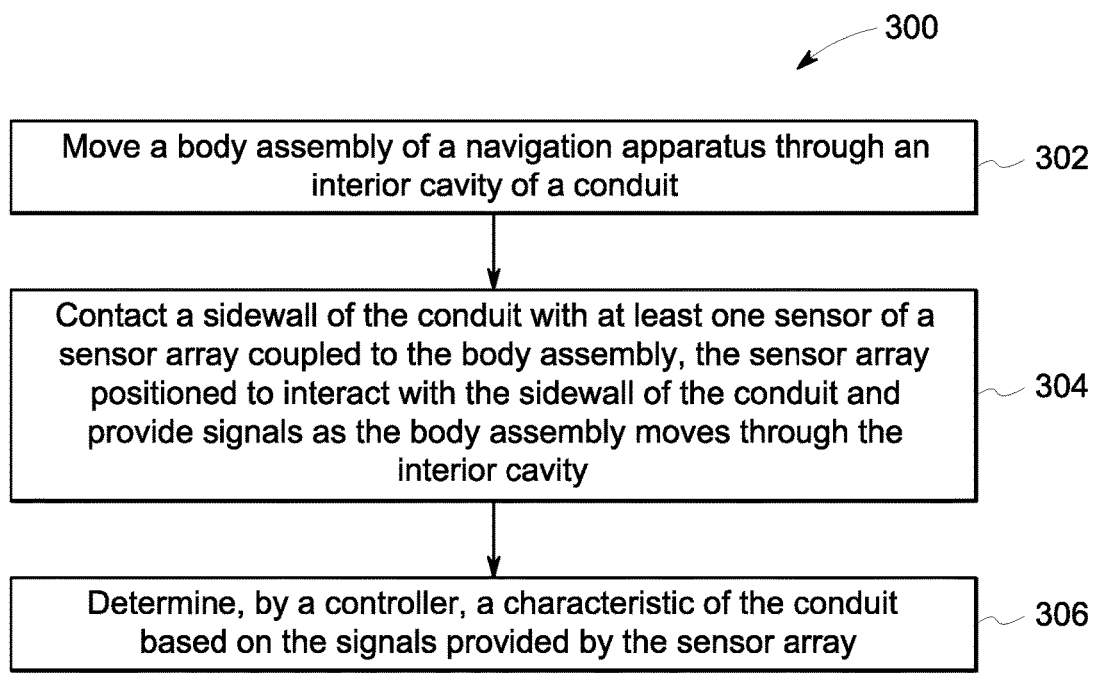
FIG. 9 is a flow chart of an example method of performing a maintenance operation using the system shown in FIG. 1.

FIG. 9 is a flow chart of an example method 300 of navigating a conduit using system 100 (shown in FIG. 1). In reference to FIGS. 1-4 and 9, method 300 includes moving 302 body assembly 134 of navigation apparatus 102 through interior cavity 112. In some embodiments, body assembly 134 is propelled through interior cavity 112 using the plurality of sections 142 of body assembly 134. For example, pressurized fluid from pressurized fluid source 120 is delivered to or removed from sections 142 of body assembly 134 to sequentially adjust a length and/or a width of sections 142 and propel body assembly 134 through interior cavity 112.

Also, method 300 includes contacting 304 sidewall 106 with at least one sensor 160 of sensor array 101 coupled to body assembly 134. Sensor array 101 is positioned to interact with sidewall 106 of conduit 104 and provide signals as body assembly 134 moves through 112 interior cavity. For example, sensors 160 are positioned circumferentially around and extend radially outward from an outer surface of body assembly 134 and/or tip 138 coupled to body assembly 134. Sensors 160 are passive devices that interact with sidewall 106 when sidewall 106 is within the reach of sensors 160. Sensors 160 provide signals or readings based on interaction with sidewall 106.

In addition, method 300 includes determining 306, by controller 116, a characteristic of conduit 104 based on information provided by sensor array 101. For example, controller 116 compares readings from sensors 160 and identifies features or elements of conduit network 105. In addition, mapping interface 117 of controller 116 is configured to generate a map of conduit network 105 based on information from sensor array 101.

In the example embodiment, any steps of method 300 are repeated any number of times required for navigation apparatus 102 to travel a desired distance through conduit 104 and/or to generate a map of conduit network 105.

Figure 10:
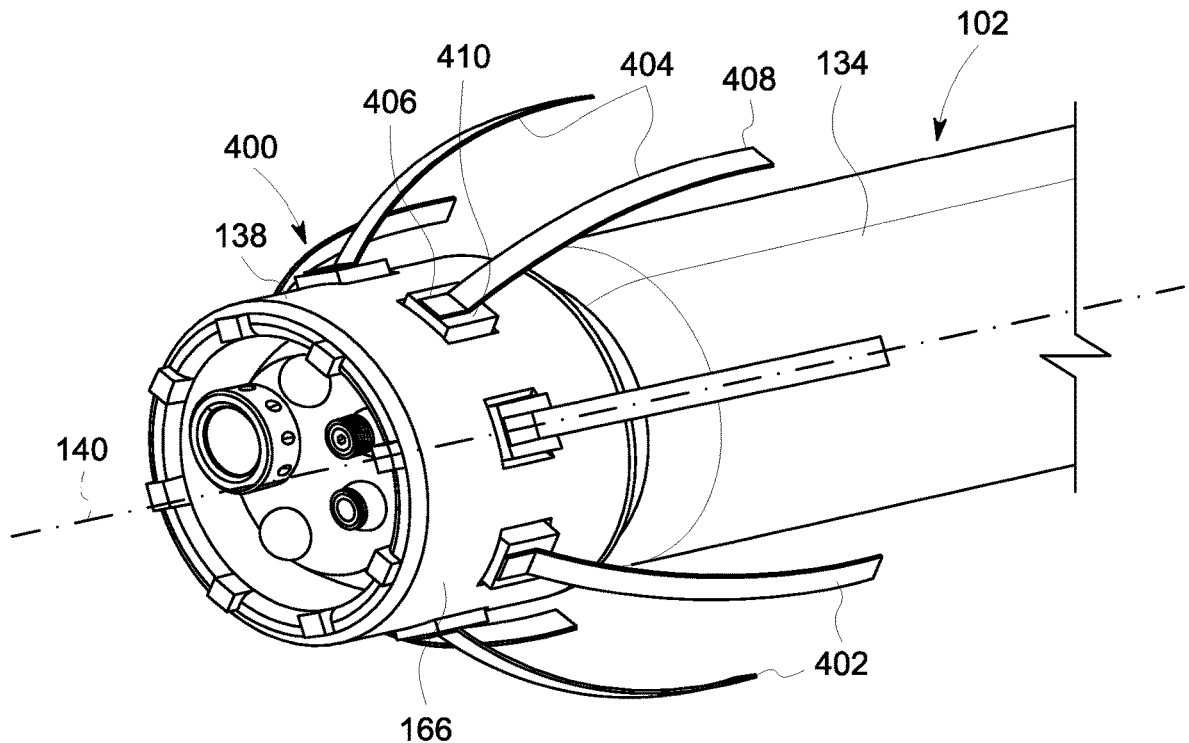
FIG. 10 is a side view of an alternative embodiment of a sensor array for use with the navigation apparatus shown in FIG. 1, the sensor array including a plurality of tactile sensors.

FIG. 10 is a side view of an alternative embodiment of a sensor array 400 for use with navigation apparatus 102. Sensor array 400 includes a plurality of tactile sensors 402 that are arranged circumferentially around tip 138. In the example embodiment, sensor array 400 includes eight of tactile sensors 402 that are uniformly spaced apart from each other and arranged around the circumference of tip 138. In alternative embodiments, sensor array 400 includes any tactile sensors 402 that enable sensor array 400 to operate as described herein.

Tactile sensors 402 comprise whiskers 404 having a first end 406 coupled to tip 138 and a free second end 408 spaced from first end 406. Whiskers 404 extend radially outward from tip 138 and are arranged to extend at least partly along longitudinal axis 140. In addition, whiskers 404 are flexible and configured to bend or flex when whiskers 404 interact with objects. For example, whiskers 404 are arranged to interact with sidewall 106 (shown in FIG. 1) of conduit 104 (shown in FIG. 1). In the example embodiment, whiskers 404 are not connected to actuators and are not actively moved towards objects. Accordingly, whiskers 404 are passive sensors.

In the example embodiment, sensor array 400 is configured to generate signals or readings based on objects contacting tactile sensors 402. For example, each tactile sensor 402 of sensor array 400 includes a sensor element 410 that generates an electronic reading based on interaction of whisker 404 with an object. Sensor array 400 provides information relating to the readings from each individual tactile sensor 402 of sensor array 400 to controller 116 (shown in FIG. 1). The readings may indicate the presence of features or elements of a conduit network and facilitate generating a map of the conduit network.

An example technical effect of the methods, systems, and apparatus described herein includes at least one of: (a) reducing the time to generate complete maps of conduit networks; (b) enabling maintenance operations and/or inspection and repair of an interior cavity of a conduit at greater distances from an access opening; (c) increasing the information that is available during maintenance operations of conduit networks; (d) reducing the power requirements for navigation apparatus during maintenance operations; (e) improving control and steering of navigation apparatus traveling through conduits; (f) increasing characterization information available for underground locations that is available during maintenance operations; and (g) providing more accurate and complete mapping of conduit networks.

Example embodiments of systems and methods for use in conduit maintenance operations are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with conduits as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a navigation apparatus comprising:
a body assembly comprising a plurality of pneumatic or artificial muscles that are configured to interact with a sidewall of a conduit and move said body assembly through the conduit, wherein said plurality of pneumatic or artificial muscles are independently actuated to steer said body assembly;
a tip coupled to said body assembly including an outer surface defining a circumference; and
a sensor array comprising a plurality of sensors arranged circumferentially around said tip and positioned to extend radially outward from said outer surface of said tip, wherein at least one sensor of said plurality of sensors is positioned to contact the sidewall of the conduit and provide signals representing the contact between the sidewall and said at least one sensor as said body assembly moves through the conduit; and
a controller communicatively coupled to said sensor array and configured to determine a characteristic of the conduit based on the signals provided by said sensor array.

2. The system in accordance with claim 1, wherein said controller is further configured to determine a location of said navigation apparatus and generate a map of a conduit network based on the location of said navigation apparatus and the characteristic of the conduit.

3. The system in accordance with Claim 1, wherein said body assembly comprises a steering section comprising a plurality of muscles that are independently actuated to steer said body assembly, wherein said tip is coupled to said steering section.

4. The system in accordance with Claim 1, wherein each sensor of said plurality of sensors comprises a body, contact pressure elements embedded within said body, and elastic support wires extending along said body, wherein a length of said body is selected for said body to extend between said body assembly and the sidewall of the conduit when said body assembly moves through the conduit.

5. The system in accordance with claim 1, wherein said body assembly has an outer surface defining a circumference of said body assembly, and wherein said sensor array comprises an additional plurality of sensors arranged circumferentially around said body assembly and positioned to extend radially outward from said outer surface of said body assembly.

6. The system in accordance with claim 1, wherein said controller is communicatively coupled to said body assembly and is configured to provide instructions to move said body assembly through the conduit.

7. The system in accordance with claim 1, wherein said controller is on board said navigation apparatus.

8. A navigation apparatus comprising:
a body assembly comprising a plurality of pneumatic or artificial muscles that are configured to interact with a sidewall of a conduit and move said body assembly through the conduit, wherein said plurality of pneumatic or artificial muscles are independently actuated to steer the body assembly; and
a sensor array coupled to said body assembly, said sensor array including a plurality of sensors extending outward from said body assembly and positioned to contact the sidewall of the conduit and provide signals representing the contact between the sidewall and said plurality of sensors as said body assembly moves through the conduit, wherein each sensor of said plurality of sensors comprises a body, contact pressure elements embedded within said body, and elastic support wires extending along said body, wherein a length of said body is selected for said body to extend between said body assembly and the sidewall of the conduit when said body assembly moves through the conduit.

9. The navigation apparatus in accordance with claim 8, further comprising a tip comprising said sensor array, wherein said tip has an outer surface defining a circumference, and wherein said plurality of sensors are arranged circumferentially around said tip and positioned to extend radially outward from said outer surface of said tip.

10. The navigation apparatus in accordance with claim 9, wherein said body assembly comprises a steering section comprising a plurality of muscles that are independently actuated to steer said body assembly, wherein said tip is coupled to said steering section.

11. The navigation apparatus in accordance with claim 8, wherein said body assembly has an outer surface defining a circumference of said body assembly, and wherein said plurality of sensors are arranged circumferentially around said body assembly and positioned to extend radially outward from said outer surface of said body assembly.

12. The navigation apparatus in accordance with claim 8, further comprising a controller configured to generate a map of the conduit based on the signals provided by said sensor array and a location of said navigation apparatus.

13. A method comprising:
   moving a body assembly of a navigation apparatus through an interior cavity of a conduit, the body assembly comprising a plurality of pneumatic or artificial muscles that are configured to interact with a sidewall of the conduit and move the body assembly through the conduit, wherein the plurality of pneumatic or artificial muscles are independently actuated to steer the body assembly, wherein a tip is coupled to the body assembly, the tip including an outer surface defining a circumference;
   contacting the sidewall with at least one sensor of a sensor array, the sensor array including a plurality of sensors arranged circumferentially around the tip and positioned to extend radially outward from the outer surface of the tip, the sensor array positioned to interact with the sidewall of the conduit and provide signals representing the contact between the sidewall and the at least one sensor as the body assembly moves through the interior cavity; and
   determining, by a controller, a characteristic of the conduit based on the signals provided by the sensor array.

14. The method in accordance with claim 13, further comprising:
   determining a location of the navigation apparatus based on position information provided by at least one position sensor coupled to the body assembly; and
   generating a map of the conduit based on the determined location and the determined characteristic of the conduit.

15. The method in accordance with claim 13, further comprising determining a path for the navigation apparatus based on the determined characteristic of the conduit.

16. The method in accordance with claim 13, wherein contacting the sidewall with the at least one sensor of a sensor array coupled to the body assembly comprises contacting the sidewall with each sensor of the plurality of sensors.

17. The method in accordance with claim 13, further comprising turning a steering section of the body assembly, the steering section including a plurality of muscles that are independently actuated to steer the body assembly, wherein the sensor array is coupled to the steering section.

* * * * *